(12) United States Patent
Raczkowski

(10) Patent No.: US 6,663,046 B2
(45) Date of Patent: Dec. 16, 2003

(54) SAFETY SYSTEM FOR COCKPIT

(76) Inventor: Mark Bogdan Raczkowski, 3750 NE. 170 St., #405, N. Miami Beach, FL (US) 33160

( * ) Notice: Subject to any disclaimer, the term of this patent is extended or adjusted under 35 U.S.C. 154(b) by 0 days.

(21) Appl. No.: 10/054,136

(22) Filed: Oct. 25, 2001

(65) Prior Publication Data

US 2003/0080249 A1 May 1, 2003

(51) Int. Cl.⁷ .................................................. B64C 1/14
(52) U.S. Cl. .................................. 244/129.5; 244/129.4
(58) Field of Search ........................ 244/118.5, 129.3, 244/129.5, 129.4; 454/280; 49/371; 52/473

(56) References Cited

U.S. PATENT DOCUMENTS

| | | | | |
|---|---|---|---|---|
| 2,754,904 A | * | 7/1956 | Provenzano | 244/129.5 X |
| 3,068,536 A | * | 12/1962 | Lieber | 52/473 |
| 3,906,669 A | * | 9/1975 | Vorguitch | 244/129.3 X |
| 4,567,930 A | * | 2/1986 | Fischer | 160/166.1 |
| 4,597,549 A | * | 7/1986 | Ryan | 244/129.5 X |
| 5,191,735 A | * | 3/1993 | Ross | 49/74.1 |
| 6,082,674 A | * | 7/2000 | White et al. | 244/129.3 |
| 6,138,424 A | * | 10/2000 | Akerson et al. | 52/473 |
| 6,296,036 B1 | * | 10/2001 | Otto et al. | 244/129.3 X |

* cited by examiner

*Primary Examiner*—Robert P. Swiatek
(74) *Attorney, Agent, or Firm*—Laurence A. Greenberg; Werner H. Stemer; Ralph E. Locher

(57) ABSTRACT

A passenger aircraft cockpit safety system, consisting of a strong, bullet resistant door and wall, both equipped with a peephole and a shielded window opening. The cockpit wall and the closed door allow for a free air exchange between passenger cabin and the cockpit.

15 Claims, 4 Drawing Sheets

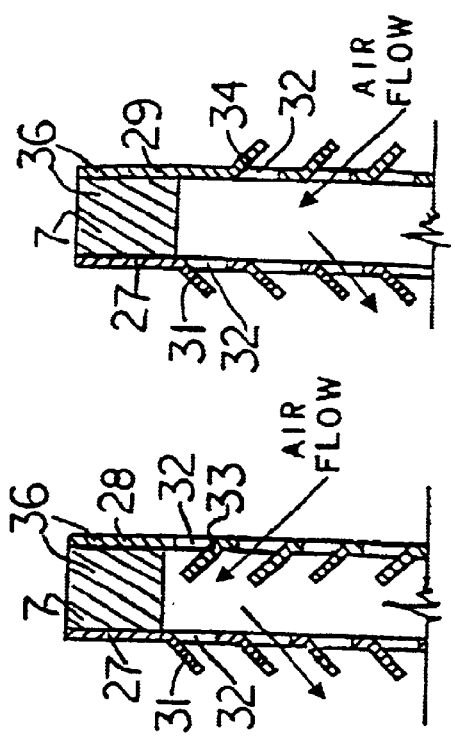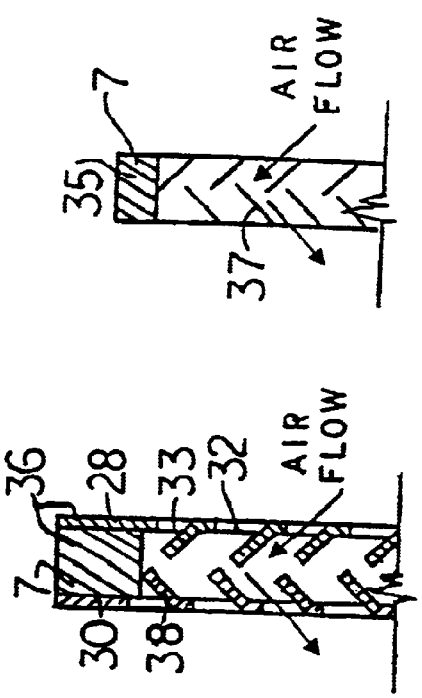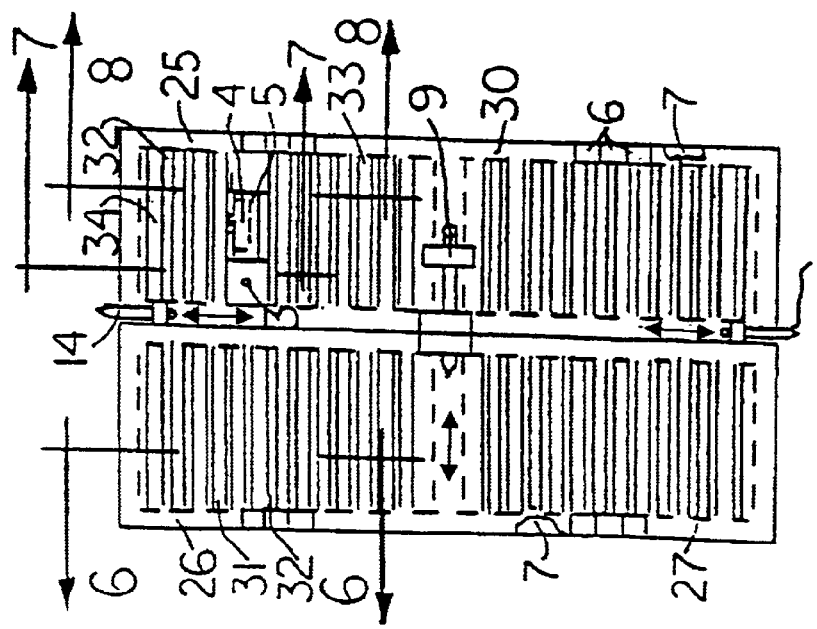

SAFETY SYSTEM FOR COCKPIT

BACKGROUND OF THE INVENTION

This invention relates to a wall and a door arrangement between passenger cabin and pilot compartment in a passenger aircraft, and it particularly relates to safety elements in this area. In the past, air travel was quite safe and an open door to a pilot cockpit was customary. Recent terrorist attacks against pilots and hijacking of airplanes alarmed the general public and created a great concern for pilots, who are now working in to dangerous environment. Existing cockpit doors cannot be strengthened and locked because they have to open automatically to balance air pressure between passenger cabin and a pilot cockpit in certain situations. This invention provides a strong cockpit door with an inside locking system, and it also allows for a free airflow between passenger and pilot compartments. Also, a cockpit wall has the same airflow arrangement.

BRIEF SUMMARY OF THE INVENTION

An object of this invention is to provide a safe environment for pilots in the cockpit, thus letting them to concentrate on their main task, piloting the airplane. This is achieved by door, locked by pilots from inside, and also by providing the door with plurality of special strips, allowing for free airflow between passenger and pilots compartments, but blocking an outside view and eventual bullets. Also, a peephole and a shielded window opening are provided for observation, and the window could be used for a crew contact, for food and beverage supply and for use of weapon in emergency. This free airflow is very important when airplane is suddenly changing altitude. The door should be built of strong materials: for example, steel, other metals, or plastics. In order to isolate pilots from passengers, a cockpit door could be completely removed and another outside door could be built for pilots. In such a case, the wall between pilots and passengers should have a plurality of special strips for allowing a free airflow. This invention is providing such a safety door and a safety wall for an airplane cockpit.

BRIEF DESCRIPTION OF THE SEVERAL VIEWS OF THE DRAWINGS

FIG. 9 is a front view of a cockpit door with plates from the cockpit side.

FIG. 10 is a partial enlarged cross section of the door from FIG. 9, taken along line 6—6.

FIG. 11 is a partial enlarged cross section of the door from FIG. 9, taken along line 7—7.

FIG. 12 is a partial enlarged cross section of the door from FIG. 9, taken along line 8—8.

FIG. 13 is a partial enlarged cross section of the door from FIG. 1, taken along line 5—5.

DETAILED DESCRIPTION OF THE INVENTION

This invention is an improvement to safety arrangement of an airplane front area between a passenger cabin and a pilot cockpit. The present invention will now be described in details with reference to accompanying drawings.

Figure 1:
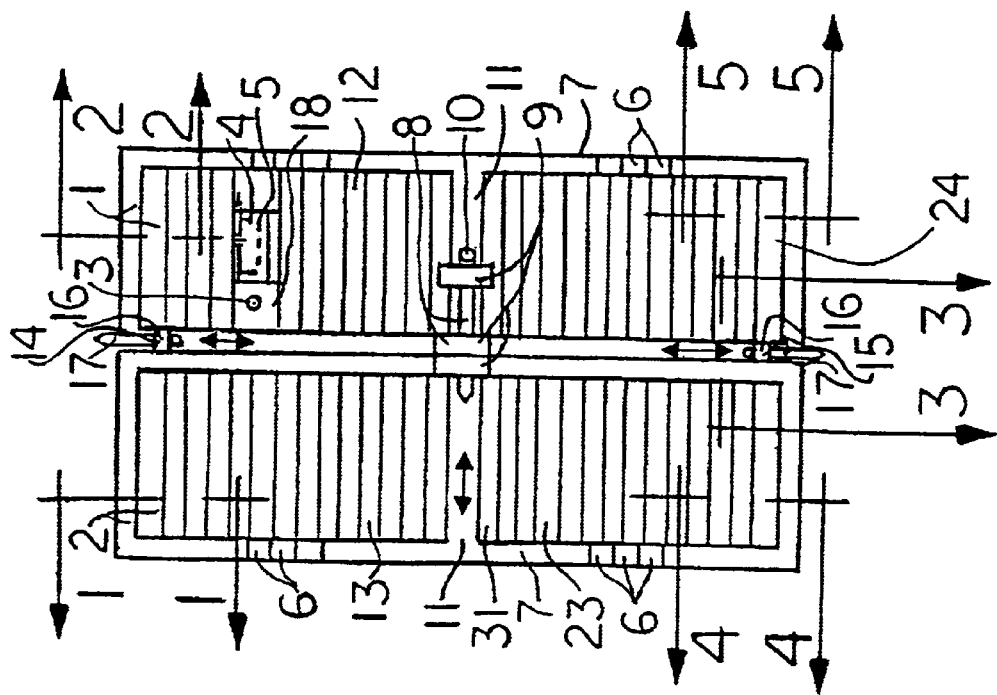
FIG. 1 is a diagrammatic front view of a cockpit door according to the invention from the cockpit side.

FIG. 1 shows a front view of a cockpit do or having two wings, a right wing 1 and a left wing 2. There is also shown a peephole 3, a window opening 4, a window shield 5, a window base 18, an upper lock 14 with its guide 16 and with a locking bar 17, a U-shaped strip 12, a Z-shaped strip 13, S-shaped strip 23, a V-shaped strip 24, a medium lock 8 with its guides 9 and a locking bar 10, a frame bar 11, a frame 7, door hinges 6, and a lower lock 15 with its guide 16 and a locking bar 17. The window shield 5 is shown in a closed and locked position. Locking the door is achieved by sliding bar 10 to the left, moving up the upper bar 17, and by sliding down the lower bar 17. In order to open the door, the locking bars have to be moved in the opposite directions, and the door wings 1 and 2 should be turned 90 degree to inside of the cockpit on their hinges 6. The peephole 3 allows the crew to see activity in the passenger cabin without opening the window shield 5. The strips could be positioned on the cockpit door in a vertical, horizontal, slant, or in any other position.

Figure 2:
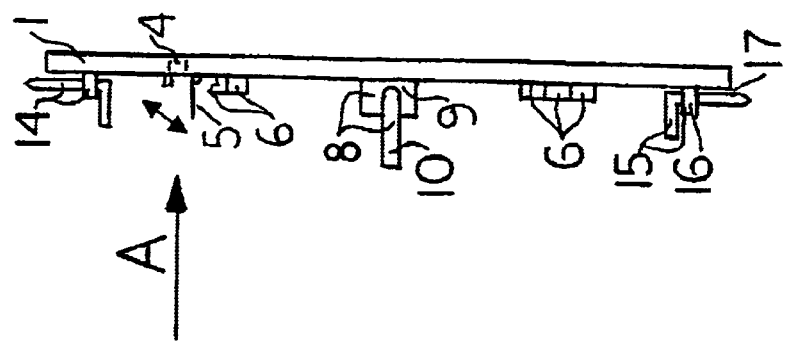
FIG. 2 is a side view of the cockpit door from the right side.

FIG. 2 shows the same parts as FIG. 1, but the window shield 5 is shown in an open position. The window opening 4 allows for a crew communication, for supply of food and beverages, and also for using weapon by pilots in an emergency situation. Portion of the upper hinges 6 are cut off in order to show the window shield 5.

Figure 3:
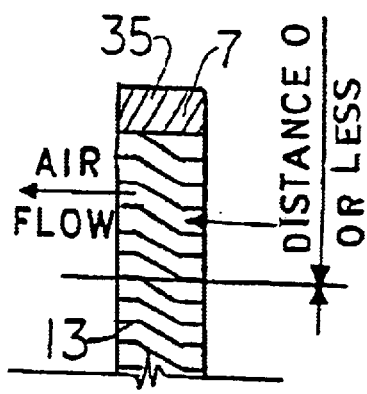
FIG. 3 is a partial enlarged cross section view of the door from FIG. 1, taken along line 1—1.

FIG. 3 shows a partial enlarged cross section of the left wing 2 and also a cross-section of a cockpit wall 35, a frame 7, and a number of Z-shaped strips 13. Both sides of each strip overlap the other sides of immediately adjacent strips. The shape of the strips 13 and their arrangement allow for a constant free airflow between both sides of the door, in both directions.

Figure 4:
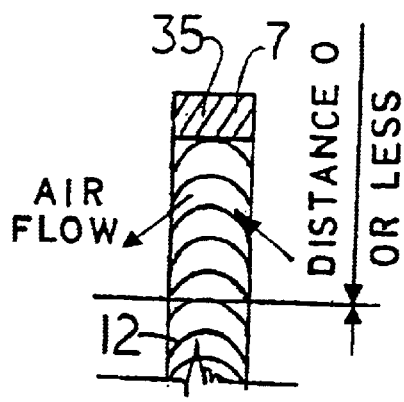
FIG. 4 is a partial enlarged view of part of the door from FIG. 1, taken along line 2—2.

FIG. 4 shows a partial cross section of the right door wing 1 and also a cross section of cockpit wall 35, a frame 7, a number of U-shaped strips 12. Both sides of each strip overlap the other sides of the immediately adjacent strips.

There could be many different shapes of strips, with different cross sections, but they cannot be flat. They have to be curvilinear in cross section.

Figure 5:
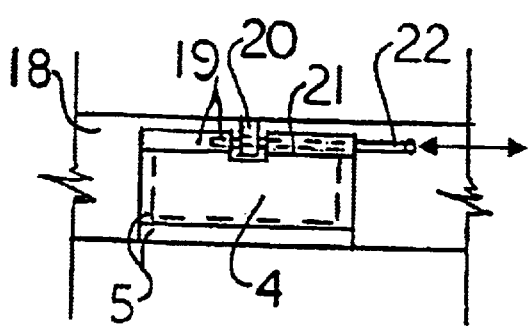
FIG. 5 is a partial enlarged view of a part of the door from FIG. 2, taken from direction A.

FIG. 5 shows a window opening 4, a window shield 5, a shield lock 19, with shield lock guides 2 and a locking bar 22. Also, a window base 18 is shown with its locking bar guide 20. Locking and unlocking of the window shield 5 is possible by moving the locking bar 22 to left or right. The window shield 5 opens by rotating to the cockpit side, as shown on FIG. 2.

Figure 6:
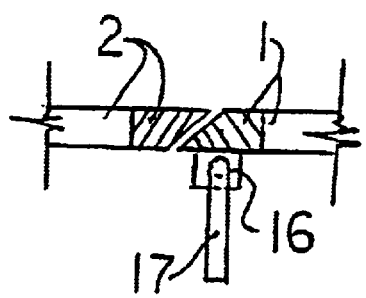
FIG. 6 is a partial enlarged cross section of the door from FIG. 1, taken along line 3—3.

FIG. 6 shows it partial cross section of the door wings 1 and 2, a low lock guide 16, and a locking bar 17. The edge of the door wing 1 is blocking movement of the door wing 2 to the cockpit direction.

Figure 7:
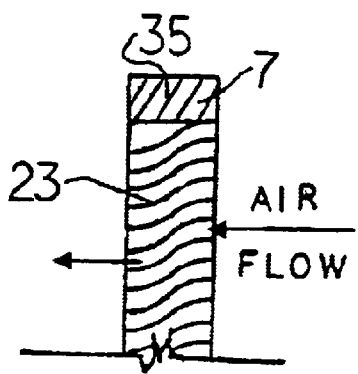
FIG. 7 is a partial enlarged cross section of the door from FIG. 1, taken along line 4—4.

FIG. 7 shows a partial enlarged cross section of the door wing 2, the cockpit wall 35, a frame 7 and a number of S-shaped strips 23. The both sides of the each strip are overlapping the other sides of next adjacent strips.

Figure 8:
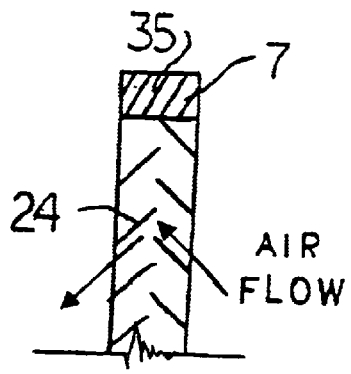
FIG. 8 is a partial enlarged cross section of the door from FIG. 1, taken along line 5—5.

FIG. 8 shows a partial enlarged cross sections of the door wing 1, the cockpit wall 35, a frame 7, and a number of V-shaped strips 24. Both sides of the each strip overlap the other sides of immediately adjacent strips.

FIG. 9 shows a front view of a cockpit door with plates, having two wings, a right wing 25 and a left wing 26. There is also shown a peephole 3, a window opening 4, a window shield 5, an upper lock 14, a medium lock 9, a lower lock 15, a frame 7, hinges 6, plates 27, 28, 29 and 30, openings 32, strips 31, 33, 34, and 38. The strips could be positioned in a vertical, slanted (i.e. diagonal), horizontal, or in any other position. A side view of the door is very similar to the door from FIG. 2, except for strips and openings, which are shown on cross sections FIGS. 10–12.

Figure 15:
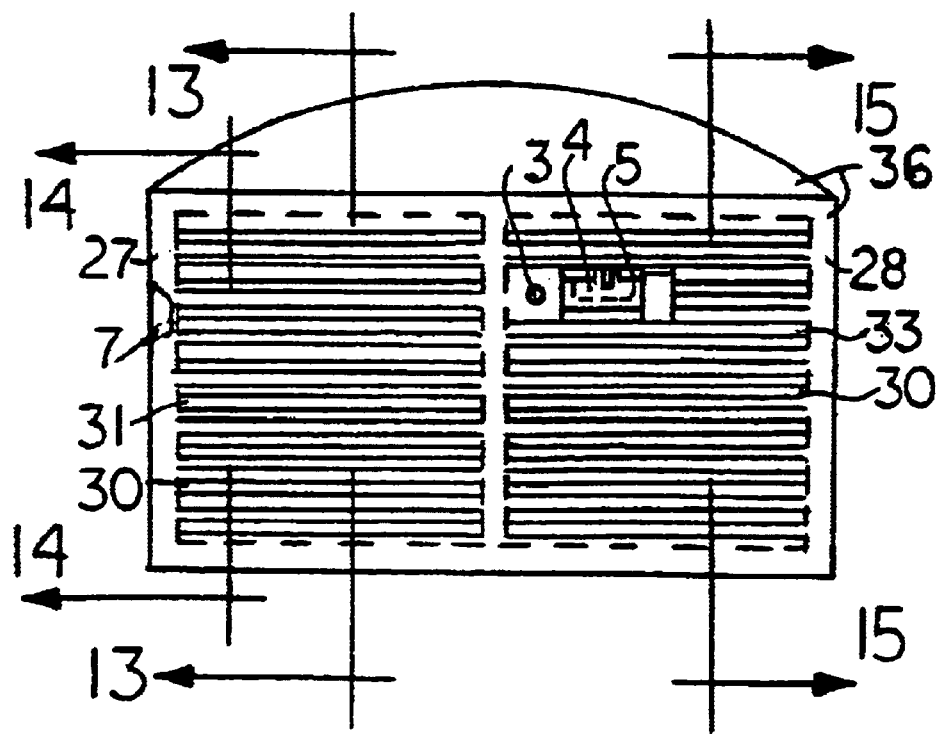
FIG. 15 is a front view of a cockpit wall with plates from the cockpit side.

FIG. 10 is a partial enlarged cross section of the door from FIG. 9 and also of the wall from FIG. 15. FIG. 10 shows a door wing 2, a wall 36, a frame 7, plates 28 and 28, opening 32, and strips 31 and 33. The strips of the plate 27 are blocking a direct linear view from openings of the plate 28, and the strips of the plate 28 are blocking a direct linear view from openings from the plate 27. The arrangement assures no outside visibility to the cockpit and it also makes these doors and walls bulletproof.

FIG. 11 shows the door wing 26, a wall 36, a frame 7, plates 27 and 29, opening 32, and strips 31 and 34. Otherwise, this arrangement is similar to the one shown on FIG. 10.

FIG. 12 shows the door wing 25, the wall 36, the frame 7, plates 28 and 30, opening 32, and strips 33 and 38. Otherwise, this arrangement is similar to the one shown on FIG. 10.

FIG. 13 shows the door wing 1, the wall 35, the frame 7, and two rows of strips 37. The strips of a first row are blocking perpendicular view through openings of a second row, and the strips of the second row are blocking perpendicular view through openings of the first row.

Figure 14:
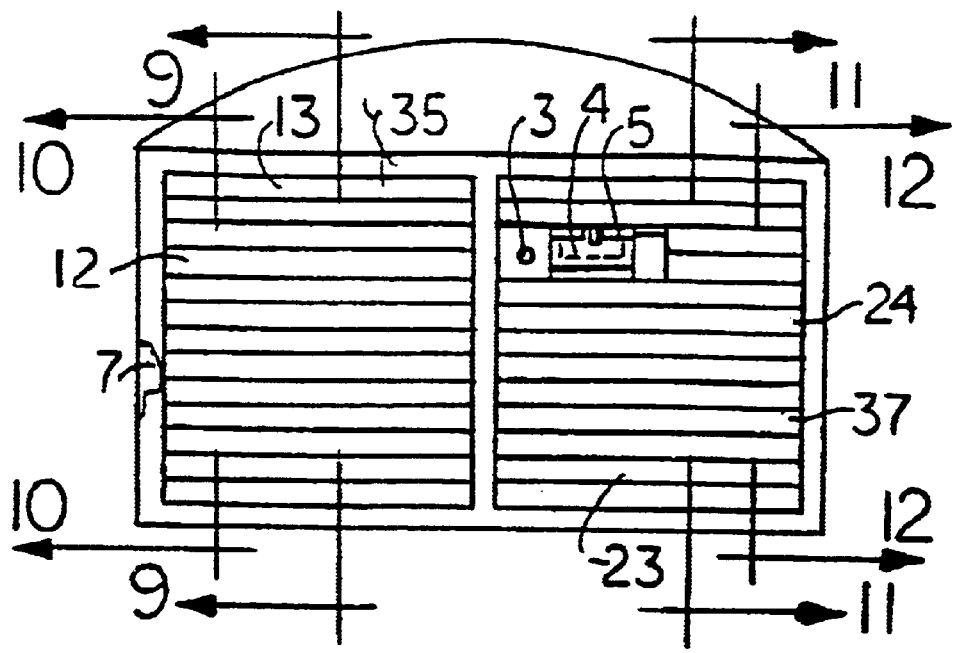
FIG. 14 is a front view of a cockpit wall from the cockpit side.

FIG. 14 shows a cockpit wall 35, a peephole 3, a window opening 4, a window shield 5, a frame 7, an opening 32, and strips 12, 13, 24, and 37. The strips can be arranged on a wall in a vertical, horizontal, slanted (i.e. diagonal), or in any other position. For cross sections of the cockpit wall, see FIGS. 3–5, 7–8, and 13.

FIG. 15 shows a cockpit wall 36, a peephole 3, a window opening 4, a window 6, a shield 5, a frame 7, an opening 32, and strips 31, 33, and 34. The strips can be arranged on a wall in a vertical, horizontal, slanted or in any other position. For cross-sections of the cockpit wall 36, see FIGS. 10–12.

I claim:

1. A door protecting an airplane cockpit, comprising a plurality of strips, said strips being parallel and being spaced apart from each other, each having a transverse curvilinear cross section and having a first side and second side opposing said first side, said strips being fixed with a first side of each strip overlapping a second side of a next adjacent strip, and a second side of each strip overlapping a first side of a next adjacent strip.

2. The door according to claim 1, wherein said strips have a C-shaped transverse cross section.

3. A door, comprising a plurality of strips, said strips being parallel and being spaced apart from each other, said strips having a Z-shaped transverse cross section and having a first side and second side opposing said first side, a first side of each strip overlapping a second side of a next adjacent strip, and a second side of each strip overlapping a first side of a next adjacent strip.

4. A door for protecting an airplane cockpit, comprising a plurality of strips, said strips being parallel and being spaced apart from each other, each having an S-shaped transverse cross section and having a first side and second side opposing said first side, a first side of each strip overlapping a second side of a next adjacent strip, and a second side of each strip overlapping a first side of a next adjacent strip.

5. A door for protecting an airplane cockpit, comprising a plurality of strips being flat in transverse cross section and configured in two side-by-side rows with openings being formed between said strips in each of said rows, a first of said rows having a number of parallel strips positioned at a first given angle, a second of said rows having a number of parallel strips positioned at a second angle, said second angle being different than said first angle, said strips of said first row blocking a direct view from any of said openings in said first row to any of said openings in said second row, and said strips of said second row blocking a direct view from any of said openings in said second row to any of said openings of said first row.

6. A door for protecting an airplane cockpit, comprising two opposing plates, each of said plates having a plurality of angled parallel strips outwardly angled on both sides of said door, each strip having a corresponding opening formed in said respective plate, said strips of said first plate blocking a direct view through said openings in said second plate, and said strips of said second plate blocking a direct view through said openings in said first plate.

7. A door for protecting an airplane cockpit, comprising two opposing plates, each of said plates having a plurality of angled parallel strips, each strip having a corresponding opening formed in said respective plate, said strips of said first plate blocking a direct view through said openings in said second plate, and said strips of said second plate blocking a direct view through said openings in said first plate;

said strips of said first plate being inwardly angled, and said strips of said second plate being outwardly angled, said strips being parallel and being spaced apart from each other, each having a transverse curvilinear cross section and having a first side and second side opposing said first side, a first side of each strip overlapping a second side of a next adjacent strip, and a second side of each strip overlapping a first side of a next adjacent strip.

8. A shield protecting an opening in a door separating an airplane cockpit from a passenger area, comprising:

a plurality of strips, said strips being parallel and being spaced apart from each other, each having a transverse curvilinear cross section and having a first side and second side opposing said first side, said strips being fixed with a first side of each strip overlapping a second side of a next adjacent strip, and a second side of each strip overlapping a first side of a next adjacent strip.

9. A wall protecting an airplane cockpit, comprising a plurality of strips, being parallel and being spaced apart from each other, each having a curvilinear transverse cross section and having a first side and second side opposing said first side, said strips being fixed with a first side of each strip overlapping a second side of a next adjacent strip, and a second side of each strip overlapping a first side of a next adjacent strip.

10. The wall according to claim 9, wherein said strips have a transverse C-shaped cross section.

11. A wall for protecting an airplane cockpit, comprising a plurality of strips, being parallel and being spaced apart from each other, each having a Z-shaped transverse cross section and having a first side and second side opposing said first side, said strips being fixed with a first side of each strip overlapping a second side of a next adjacent strip, and a second side of each strip overlapping a first side of a next adjacent strip.

12. A wall for protecting an airplane cockpit, comprising a plurality of strips, being parallel and being spaced apart from each other, each of said strips having a S-shaped transverse cross section and having a first side and second side opposing said first side, a first side of each strip overlapping a second side of a next adjacent strip, and a second side of each strip overlapping a first side of a next adjacent strip.

13. A wall for protecting an airplane cockpit, comprising a plurality of strips being flat in transverse cross section and disposed in two side-by-side rows, each of said rows having openings formed therein between said strips, said strips of a first of said rows being positioned at a first given angle, said strips of a second of said rows being positioned at a second given angle different from said first angle, said strips of said first row blocking a direct view through said openings in said second row, and strips of said second row blocking a direct view through said openings in said first row.

14. A wall for protecting an airplane cockpit, comprising two opposing plates, each of said plates having a plurality of outwardly angled parallel strips and openings formed between said strip, said strips of a first of said plates blocking a direct view through said openings of a second of said plates, and said strips of said second of said plates blocking a direct view through said openings of said first of said plates.

15. A wall for protecting an airplane cockpit, comprising two opposing plates, each of said plates having a plurality of parallel strips and openings formed between said strips, said strips of said first of said plates being inwardly angled, and said strips of said second of said plates being outwardly angled, said strips of a first of said plates blocking a direct view through said openings of a second of said plates, and said strips of said second of said plates blocking a direct view through said openings of said first of said plates.

* * * * *